(12) United States Patent
Yamaguchi et al.

(10) Patent No.: US 6,370,089 B1
(45) Date of Patent: Apr. 9, 2002

(54) MAGNETO-OPTICAL RECORDING MEDIUM SIMPLIFYING TRANSFER OF MAGNETIC DOMAIN

(75) Inventors: Atsushi Yamaguchi, Ogaki; Kenichiro Mitani, Gifu, both of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/208,853

(22) Filed: Dec. 10, 1998

(30) Foreign Application Priority Data

Dec. 12, 1997 (JP) .............................. 9-342886
Feb. 23, 1998 (JP) ............................ 10-040533

(51) Int. Cl.⁷ .............................................. G11B 11/00
(52) U.S. Cl. ................... 369/13.42; 369/13.38
(58) Field of Search .................... 369/13, 14, 110; 360/59, 114; 428/494 MM, 694 ML (56) References Cited

U.S. PATENT DOCUMENTS

| | | | | |
|---|---|---|---|---|
| 5,563,851 A | * | 10/1996 | Yamazaki .................... | 369/13 |
| 5,719,829 A | * | 2/1998 | Nishimura .................... | 369/13 |
| 5,825,723 A | * | 10/1998 | Hirokane et al. ............. | 369/13 |
| 5,871,855 A | * | 2/1999 | Izumi et al. ................. | 369/13 |
| 5,901,118 A | | 5/1999 | Iketani et al. ............... | 369/13 |
| 5,935,701 A | * | 8/1999 | Nishimura .................... | 369/13 |
| 5,939,187 A | * | 8/1999 | Hirokane et al. ............. | 369/13 |
| 5,955,191 A | * | 9/1999 | Hirokane et al. ............. | 369/13 |
| 5,982,715 A | * | 11/1999 | Mori et al. ................... | 369/13 |
| 5,989,705 A | | 11/1999 | Nakajima et al. ............ | 428/332 |
| 6,033,752 A | * | 3/2000 | Suzuki et al. ............... | 369/283 |

FOREIGN PATENT DOCUMENTS

| | | |
|---|---|---|
| DE | 196 46 896 | 5/1997 |
| DE | 197 06 483 | 8/1997 |
| EP | 0 606 155 | 7/1994 |
| EP | 0 782 135 | 7/1997 |
| JP | 4-243039 | 8/1992 |

\* cited by examiner

*Primary Examiner*—Tan Dinh
(74) *Attorney, Agent, or Firm*—Armstrong, Westerman & Hattori, LLP (57) ABSTRACT

A magneto-optical recording medium including a substrate, a reproducing layer formed on the substrate, an intermediate layer formed on the reproducing layer, a recording layer formed on the intermediate layer and a high magnetization layer formed on the recording layer. The intermediate layer is made of a non-magnetic material, and set at a prescribed thickness so that a leakage magnetic field from the recording layer to the reproducing layer is so distributed that the intensity thereof is increased from an end to the center of its domain. The high magnetization layer is made of an alloy or a multilayer film of a noble metal and a transition metal having saturation magnetization stronger than that of the recording layer under a reproducing temperature. At room temperature, the coercive force of the recording layer is larger than that of the high magnetization layer. Consequently, transfer/enlargement from the recording layer to the reproducing layer is readily caused in this magneto-optical recording medium.

14 Claims, 8 Drawing Sheets

MAGNETO-OPTICAL RECORDING MEDIUM SIMPLIFYING TRANSFER OF MAGNETIC DOMAIN

BACKGROUND OF THE INVENTION

1. Field of the Invention

The present invention relates to a magneto-optical recording medium, and more particularly, it relates to an improvement in a magneto-optical recording medium for reproducing a signal by enlarging a magnetic domain.

2. Description of the Related Art

A magneto-optical recording medium, which is noted as a reloadable and highly reliable recording medium having a large storage capacity, is put into practice as a computer memory or the like. Further, standardization of a magneto-optical recording medium having a storage capacity of 6.1 Gbytes at a diameter of 12 cm is recently progressed.

In addition, a magnetic domain enlarging/reproducing technique of applying an alternating magnetic field in signal reproduction from a magneto-optic recording medium for reproducing a signal by enlarging a magnetic domain transferred from a recording layer to a reproducing layer with the alternating magnetic field is developed, and a magneto-optical recording medium which can record and/or reproduce a signal of 14 Gbytes in/from a disk of 12 cm in diameter through this technique is also proposed.

In the signal reproduction employing such a magnetic domain enlarging/reproducing technique, the magnetic domain of the recording layer recording the signal is transferred to the reproducing layer so that the transferred magnetic domain is enlarged by the externally applied alternating magnetic field and reproduced. In this case, the magnetic domain is transferred from the recording layer to the reproducing layer by exchange coupling or magnetostatic coupling. In case of transferring the magnetic domain by magnetostatic coupling, a non-magnetic layer is provided between the recording layer and the reproducing layer so that the magnetic domain is transferred from the recording layer to the reproducing layer when the intensity of a leakage magnetic field reaching the reproducing layer from the magnetic domain exceeds coercive force reduced as the temperature of the reproducing layer is increased.

When transferring the magnetic domain from the recording layer to the reproducing layer by magnetostatic coupling, therefore, the thickness of the non-magnetic layer must be reduced to some extent in order to increase the intensity of the leakage magnetic field reaching the reproducing layer from the recording layer.

Figure 1A:
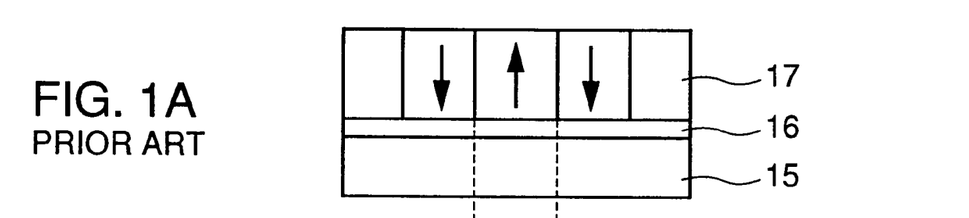
FIGS. 1A and 1B illustrate a leakage magnetic field from a recording layer to a reproducing layer of a conventional magneto-optical recording medium having a thin non-magnetic layer.
Figure 1B:
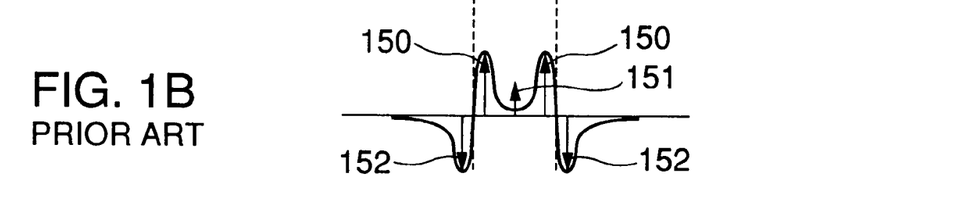

If the thickness of a non-magnetic layer 16 is reduced as shown in FIG. 1A, however, a leakage magnetic field reaching a reproducing layer 15 from a recording layer 17 through the non-magnetic layer 16 is strongly distributed as shown by arrows 150 around peripheral portions of its domain as shown in FIG. 1B, while leakage magnetic fields 152 opposite to the magnetization direction of the magnetic domain to be reproduced are formed outside the domain, and the leakage magnetic fields 152 are as strong as the parts 150 of the leakage magnetic field distributed around the peripheral portions of the domain. Consequently, the leakage magnetic fields 152 prevent enlargement of the magnetic domain, and hence the magnetic domain transferred to the reproducing layer 15 is disadvantageously insufficiently enlarged by an externally applied alternating magnetic field.

Figure 2A:
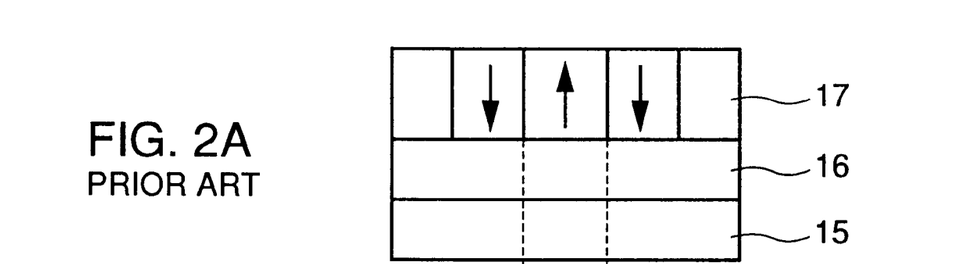
FIGS. 2A and 2B illustrate a leakage magnetic field from a recording layer to a reproducing layer of another conventional magneto-optical recording medium having a thick non-magnetic layer.
Figure 2B:
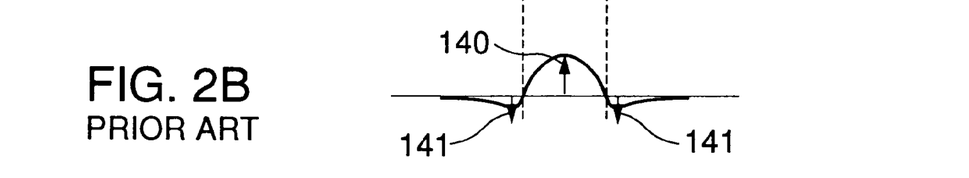

When the thickness of a non-magnetic layer 16 is increased to some extent for distributing a leakage magnetic field so that the intensity thereof is maximized at the center of its domain, on the other hand, a part 140 of the leakage magnetic field around the center of its domain hardly reaches a reproducing layer 15 although leakage magnetic fields 141, opposite to the magnetization direction of a magnetic domain to be reproduced, formed outside the domain are reduced in intensity, as shown in FIGS. 2A and 2B. If the non-magnetic layer 16 has a large thickness, therefore, the magnetic domain is hardly transferred.

SUMMARY OF THE INVENTION

Accordingly, an object of the present invention is to provide a magneto-optical recording medium capable of readily transferring a magnetic domain from a recording layer to a reproducing layer and readily enlarging the transferred magnetic domain.

According to the present invention, the magneto-optical recording medium includes a reproducing layer, an intermediate layer formed on the reproducing layer, and a recording layer formed on the intermediate layer. The recording layer includes a first layer having first saturation magnetization and first coercive force and a second layer having second saturation magnetization larger than the first saturation magnetization at a reproducing temperature and second coercive force smaller than the first coercive force at the room temperature. Preferably, the second layer is made of an alloy of a noble metal and a transition metal. Alternatively, the second layer is formed by alternately stacking a first thin film made of a noble metal and a second thin film made of a transition metal. Alternatively, the second layer contains a transition metal and a metal having a magnetic moment ferromagnetically exchange-coupling with the transition metal.

In the aforementioned magneto-optical recording medium, the saturation magnetization of the second layer is larger than that of the first layer at the reproducing temperature, to increase the intensity of a leakage magnetic field reaching the reproducing layer from the recording layer through the intermediate layer. Therefore, a magnetic domain of the recording layer is reliably transferred to the reproducing layer and the transferred magnetic domain can be reliably enlarged. On the other hand, the coercive force of the first layer is larger than that of the second layer at the room temperature, and hence the recording layer can reliably maintain a signal recorded therein.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
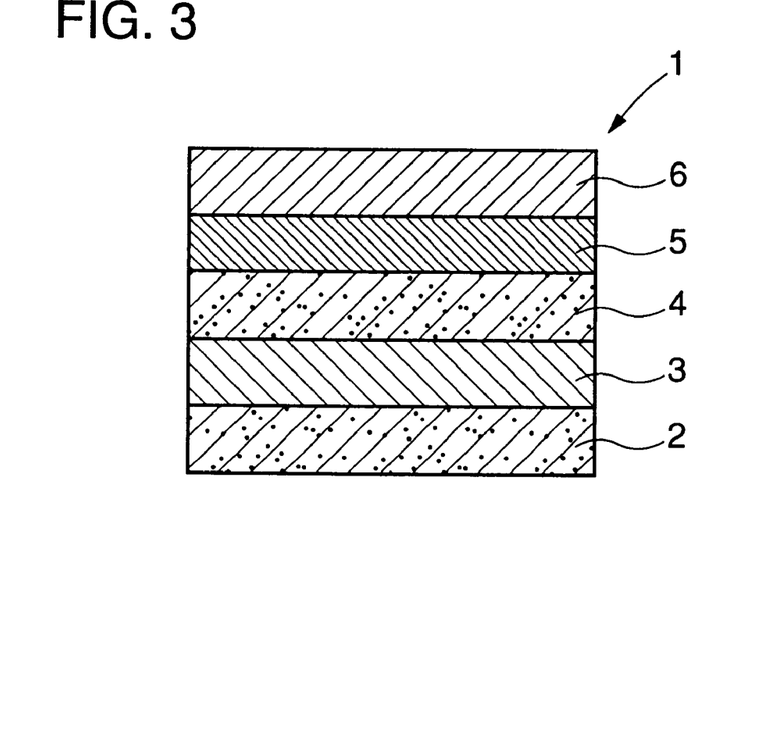
FIG. 3 is a sectional view showing the structure of a magneto-optical recording medium according to an embodiment of the present invention.

Embodiments of the present invention are now described with reference to the drawings. FIG. 3 is a sectional view showing a magneto-optical recording medium 1 according to an embodiment of the present invention, The magneto-optical recording medium 1 includes a transparent substrate 2 of polycarbonate or the like, a reproducing layer 3 of GdFeCo, an intermediate layer 4 of SiN, a recording layer 5 of TbFeCo and a high magnetization layer (recording layer) 6 of an alloy of Pd and Co. The reproducing layer 3, the intermediate layer 4, the recording layer 5 and the high magnetization layer 6 are formed by magnetron sputtering, and hence the magneto-optical-recording medium 1 can be conveniently prepared in a single apparatus when setting targets of the materials forming the respective layers in the apparatus. The thicknesses of the reproducing layer 3, the intermediate layer 4, the recording layer 5 and the high magnetization layer 6 are 100 to 300 Å, 200 to 500 Å, 300 to 1000 Å and 300 to 1000 Å respectively.

Figure 4:
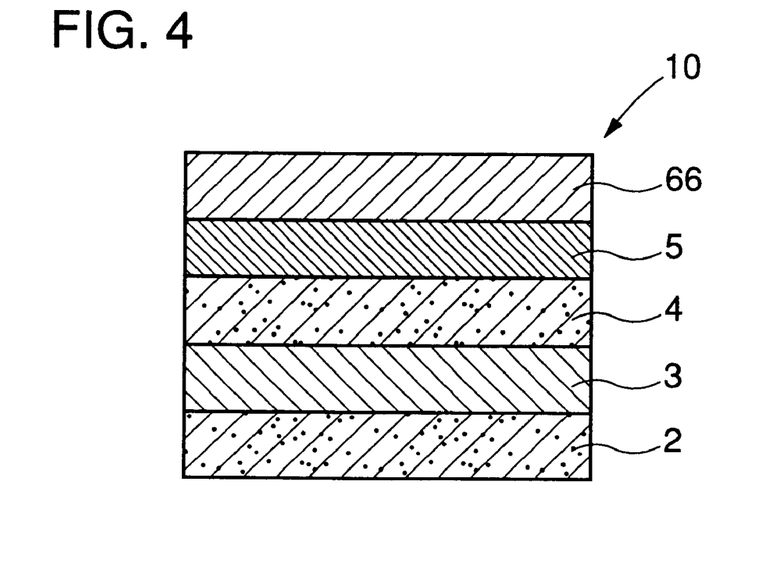
FIG. 4 is a sectional view showing the structure of a magneto-optical recording medium according to another embodiment of the present invention.

FIG. 4 illustrates a magneto-optical recording medium 10 according to another embodiment of the present invention. The magneto-optical recording medium 10 according to this embodiment is different from the magneto-optical recording medium 1 shown in FIG. 3 only in a point that a high magnetization layer 66 of a multilayer structure formed by alternately stacking thin films of Pd and those of Co substitutes for the high magnetization layer 6 of Pd and Co provided on the magneto-optical recording medium 1.

Figure 5:
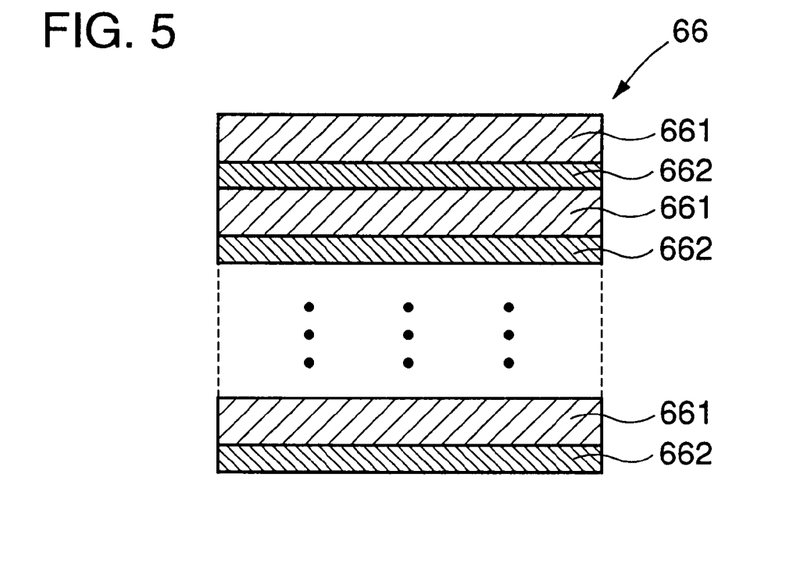
FIG. 5 is a sectional view showing the structure of a high magnetization layer of the magneto-optical recording medium shown in FIG. 4.

The structure of the high magnetization layer 66 is now described in detail with reference to FIG. 5. The high magnetization layer 66 has a structure obtained by alternately stacking first thin films 661 of Pd and second thin films 662 of Co, and the thicknesses of the first and second thin films 661 and 662 are 8 Å and 2 Å respectively. Therefore, the thickness per cycle of the high magnetization layer 66 is 10 Å, and when the total thickness of the high magnetization layer 66 is 500 Å, the first thin films 661 and the second thin films 662 are formed for 50 cycles. Thin films of Pd and Co are formed by magnetron sputtering, and hence the high magnetization layer 66 can be readily formed by alternately moving a transparent substrate 2 between targets of Pd and Co. When the high magnetization layer 66 is thus formed as a multilayer film, the intensity of a leakage magnetic field can be uniformly increased along a surface of the magneto-optical recording medium 10.

While the recording layer 5 is formed on the intermediate layer 4 and the high magnetization layer 6 is formed on the recording layer 5 in the above description, the high magnetization layer 6 may alternatively be formed on the intermediate layer 4 so that the recording layer 5 is formed on the high magnetization layer 6. While Pd and Co are employed as a noble metal and a transition metal forming the high magnetization layer 6 or 66, further, the present invention is not restricted to this but Pt, Au, Co or Ag may be employed as the noble metal and Ni, Fe or Mn may be employed as the transition metal.

Figure 6A:
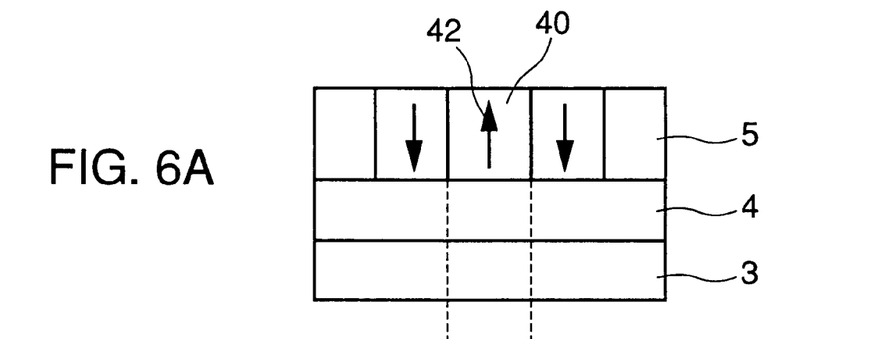
FIGS. 6A and 6B illustrate a leakage magnetic field from a recording layer to a reproducing layer in a magneto-optical recording medium having no high magnetization layer.
Figure 6B:
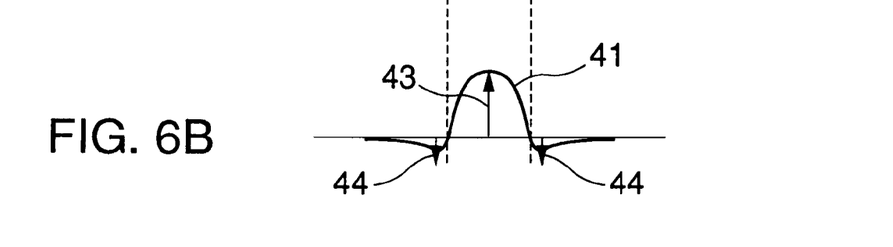

The function of the high magnetization layer 6 in the magneto-optical recording medium 1 is now described with reference to FIGS. 6A and 6B and 7A and 7B. FIGS. 6A and 6B typically show a leakage magnetic field 41 from a magnetic domain 40 of a recording layer 5 on a reproducing layer 3 in a magneto-optical recording medium having no high magnetization layer 6 formed on the recording layer 5. The thickness of an intermediate layer 4 is set in the range of 200 to 500 Å, so that the leakage magnetic field 41 from the recording layer 5 is not distributed as shown in FIG. 1B on the reproducing layer 3. In the magneto-optical recording medium having no high magnetization layer 6, therefore, the leakage magnetic field 41 on the reproducing layer 3 is magnetized as shown by arrow 43 in the same direction as the magnetic domain 40 of the recording layer 5, which is magnetized as shown by arrow 42, and the distribution thereof is maximized around the center of its domain while magnetic fields 44 opposite to the magnetic field 41 are present outside the domain. In this case, the magnetic fields 44 are weak and do not hinder enlargement of the magnetic domain 40 with an external magnetic field if the magnetic domain 40 of the recording layer 5 is transferred to the reproducing layer 3 by the leakage magnetic field 41. However, the intensity of the leakage magnetic field 41 is insufficient for transferring the magnetic domain 40 from the recording layer 5 to the reproducing layer 3, and hence the magnetic domain 40 cannot be transferred from the recording layer 5 to the reproducing layer 3 by the leakage magnetic field 41. While the intensity of the leakage magnetic field 41 can be increased by reducing the thickness of the intermediate layer 4, the intensity of the leakage magnetic field 41 is disadvantageously distributed as shown in FIG. 1B in this case, to result in inferior enlargement/reproduction of the magnetic domain 40.

Figure 7A:
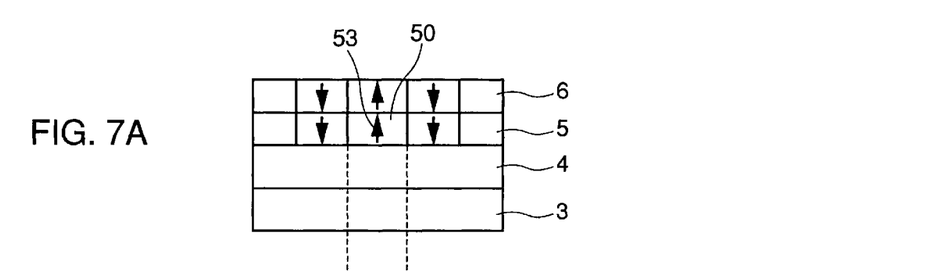
FIGS. 7A and 7B illustrate a leakage magnetic field from a recording layer to a reproducing layer in a magneto-optical recording medium having a high magnetization layer.
Figure 7B:
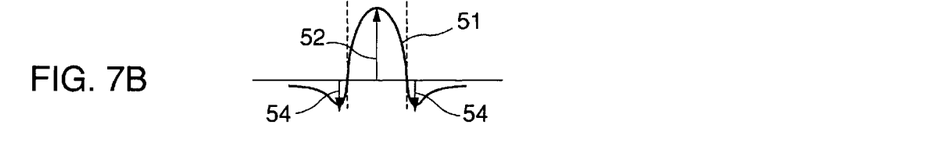
Figure 8:
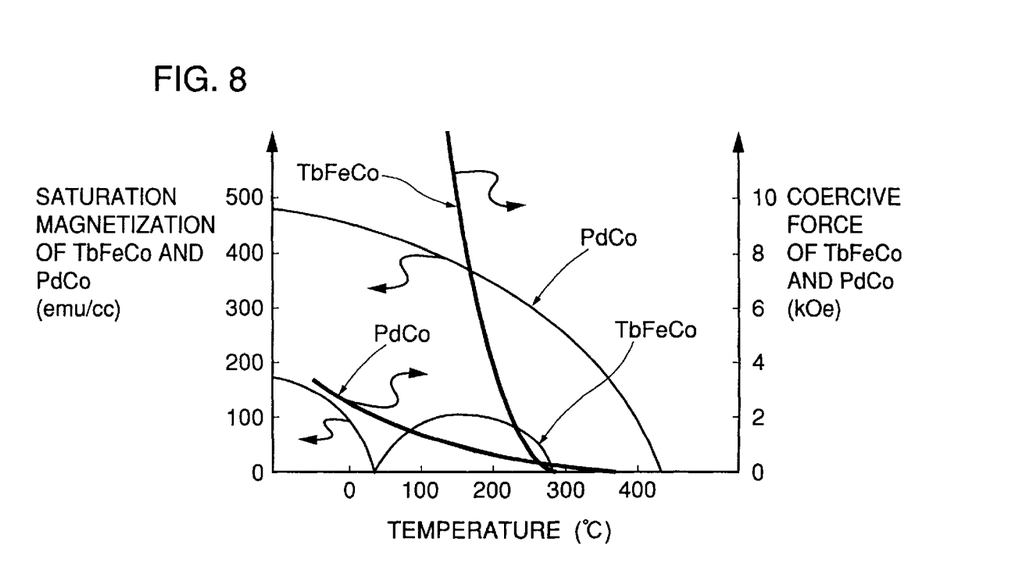
FIG. 8 illustrates the temperature dependencies of saturation magnetization and coercive force of TbFeCo and PdCo.

Therefore, the high magnetization layer 6 must be formed on the recording layer 5 as shown in FIG. 7A for increasing the intensity of a leakage magnetic field 51 from the recording layer 5 to the reproducing layer 3 without reducing the thickness of the intermediate layer 4. Referring to FIG. 7A, the thicknesses of the recording layer 5 and the high magnetization layer 6 are so set that the sum thereof is identical to the thickness of the recording layer 5 shown in FIG. 6A. As shown in FIGS. 7A and 7B, the leakage magnetic field 51 from the recording layer 5 on the reproducing layer 3 is strongly distributed around the center of its domain as shown by arrow 52, due to the high magnetization layer 6 formed on the recording layer 5. While magnetic fields 54 opposite to the magnetization direction 53 of a magnetic domain 50 of the recording layer 5 are present outside the domain, the intensity of these magnetic fields 54 is too small to prevent the magnetic domain 50, transferred from the recording layer 5 to the reproducing layer 3 through the intermediate layer 4, from enlargement with an external magnetic field. Thus, the high magnetization layer 6 formed on the recording layer 5 increases the intensity of the leakage magnetic field 51 from the recording layer 5 to the reproducing layer 3, due to the difference in saturation magnetization between TbFeCo, the magnetic material for the recording layer 5, and the alloy of Pd and Co, the material for the high magnetization layer 6, as shown in FIG. 8. FIG. 8 shows the temperature dependencies of saturation magnetization and coercive force of the recording layer 5 and the high magnetization layer 6. The saturation magnetization of TbFeCo is reduced as the temperature is increased, zeroed around the room temperature, thereafter increased as the temperature is increased, and maximized at a temperature of about 170° C. Thereafter the saturation magnetization is reduced as the temperature is increased and zeroed at a temperature of about 280° C. The maximum value around the temperature of 170° C. is about 100 emu/cc. On the other hand, the saturation magnetization of the alloy of Pd and Co is reduced as the temperature is increased and zeroed at a temperature of about 420° C., while this saturation magnetization is larger than that of TbFeCo by about several times. Therefore, the alloy of Pd and Co has saturation magnetization of about 300 to 400 emu/cc in the range of 100 to 160° C., the temperature (reproducing temperature) of the magneto-optical recording medium for reproducing a signal. Consequently, the intensity of the leakage magnetic field from the recording layer 5 to the reproducing layer 3 can be increased.

On the other hand, the coercive force of TbFeCo is rapidly reduced as the temperature is increased, and zeroed at a Curie point around 280° C. The coercive force of the PdCo alloy is loosely reduced as the temperature is increased, and zeroed at a Curie point around 360° C. TbFeCo has higher coercive force at the room temperature (the peripheral temperature for the magneto-optical recording medium in a general used state: about −10 to 50° C.).

In general, saturation magnetization and coercive force are in trade-off relation to each other. In other words, a magnetic material having large saturation magnetization has small coercive force and that having small saturation magnetization has large coercive force. In the magneto-optical recording medium 1, therefore, the saturation magnetization of the high magnetization layer 6 of the PdCo alloy is larger than that of the recording layer 5 of TbFeCo under the reproducing temperature, while the coercive force of the recording layer 5 is larger than that of the high magnetization layer 6 under the room temperature. Consequently, the high magnetization layer 6 increases the intensity of the leakage magnetic field from the recording layer 5 at the reproducing temperature, while the recording layer 5 maintains a signal recorded therein at the room temperature. This also applies to the high magnetization layer 66 prepared by alternately stacking the thin films of Pd and those of Co, and further to an alloy or a multilayer of a noble metal and a transition metal other than Pd and Co.

Operations of the magneto-optical recording medium 1 including the high magnetization layer 6 are now described with reference to FIGS. 9A to 9C and 10.

Figure 9A:
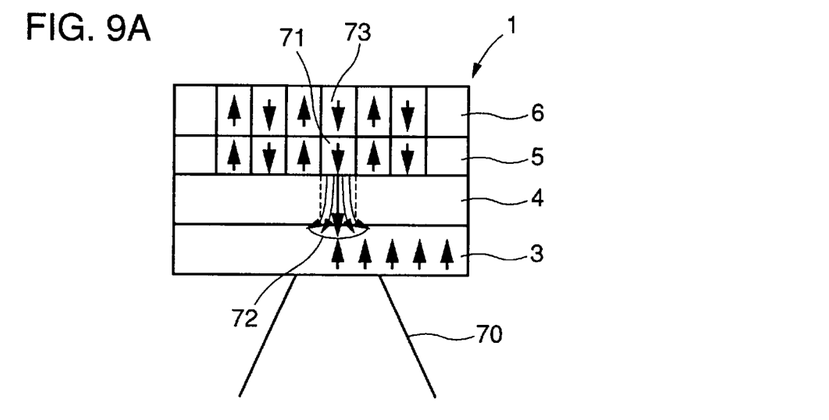
FIG. 9A illustrates a process of leakage of a magnetic field from a recording layer to a reproducing layer in the magneto-optical recording medium shown in FIG. 3.
Figure 9B:
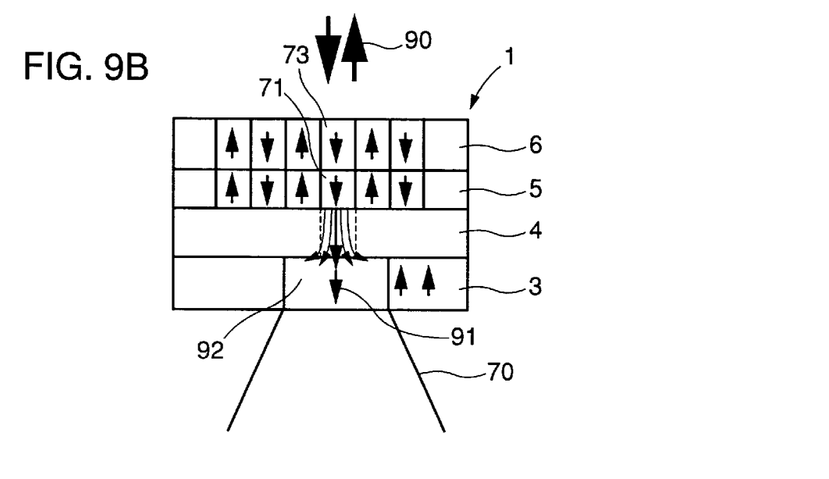
FIG. 9B illustrates a process of transfer/enlargement of the magnetic domain subsequently to FIG. 9A.
Figure 9C:
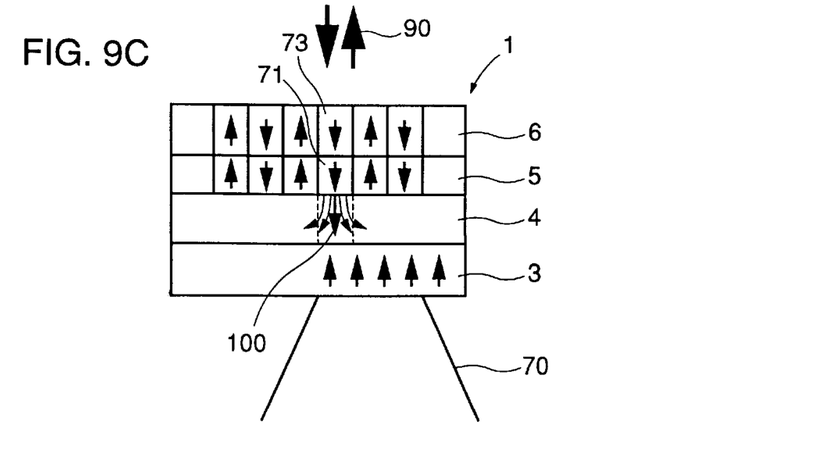
FIG. 9C illustrates a process of disappearance of the transferred/enlarged magnetic domain subsequently to FIG. 9B.
Figure 10:
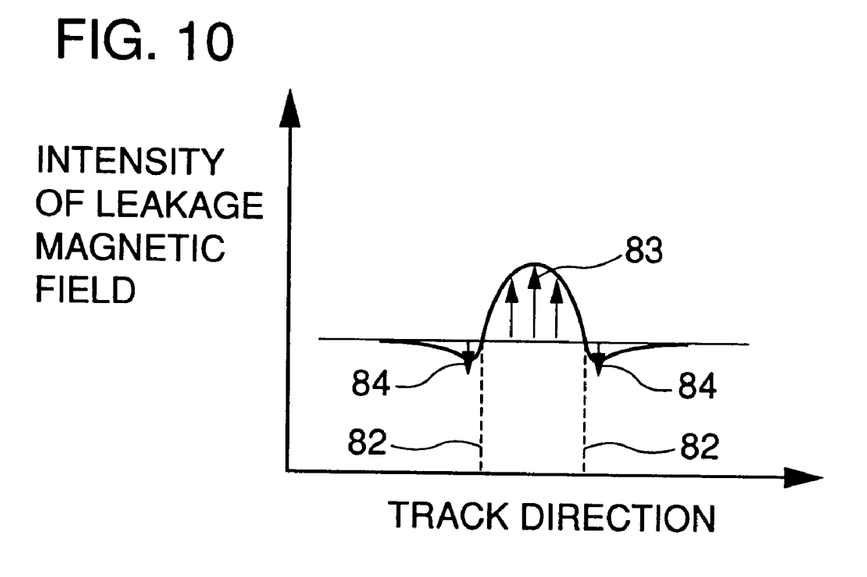
FIG. 10 illustrates the intensity distribution of a leakage magnetic field reaching the reproducing layer from the recording layer shown in FIG. 9A.

Referring to FIG. 9A, the magneto-optical recording medium 1 is irradiated with a laser beam 70 from the side of the reproducing layer 3, and the intensity of a leakage magnetic field 72 reaching the reproducing layer 3 from the recording layer 5 is increased by temperature increase of a region of a magnetic domain 71 of the recording layer 5 and a magnetic field from another magnetic domain 73 of the recording layer 5 magnetized in the same direction as the magnetic domain 71. In this case, the leakage magnetic field 72 reaching the reproducing layer 3 is so distributed that the intensity thereof is increased from ends 81 and 82 of its domain toward the center in a region enclosed with the ends 81 and 82 and maximized around the center of the domain. The direction of the leakage magnetic field 83 is identical to that of magnetization of the magnetic domain 81 of the recording layer 5. The intensity of the leakage magnetic field 83 is increased from the ends 81 and 82 of the domain toward the center since the thickness of the intermediate layer 4 is increased to some extent in the magneto-optical recording medium 1 according to the present invention, so that the leakage magnetic field 83 is not distributed as shown in FIG. 1B. While magnetic fields 84 opposite to the magnetization direction of the magnetic domain 71 are present outside the domain, the intensity of these magnetic fields 84 is small. When an external magnetic field is applied to the magneto-optical recording medium 1 in this state, therefore, the magnetic domain 71 is transferred from the recording layer 5 to the reproducing layer 3 through the intermediate layer 4 by magnetostatic coupling, and the transferred magnetic domain 71 is enlarged when a part of an alternating magnetic field 90, which is the external magnetic field, in the same direction as the magnetization direction of the magnetic domain 71 is applied, to result in appearance of a large magnetic domain 92 magnetized in the same direction as the magnetic domain 71 of the recording layer 5 as shown by arrow 91. This magnetic domain 92 is substantially enlarged to a size close to the beam diameter of the laser beam 70, and hence the laser beam 70 detects a reproducing signal on the basis of the enlarged magnetic domain 92. Consequently, a large reproducing signal can be detected. After detecting the reproducing signal, the laser beam 70 moves from the position of the magnetic domain 71 of the recording layer 5 along the track as shown in FIG. 9C. A leakage magnetic field 100 from the magnetic domain 71 is weakened when the temperature of the magnetic domain 71 of the recording layer 5 is reduced, and the enlarged magnetic domain 92 transferred to the reproducing layer 3 disappears when an external magnetic field opposite to the magnetization direction of the magnetic domain 71 is applied to the magneto-optical recording medium 1. The signal recorded in the recording layer 5 of the magneto-optical recording medium 1 was reproduced by repeating the aforementioned steps.

As described with reference to FIGS. 9A to 9C, the high magnetization layer 6 increases the intensity of the leakage magnetic field while maintaining the distribution thereof so that the intensity is increased from the ends of the domain toward the center when transferring the magnetic domain of the recording layer 5 to the reproducing layer 3 through the intermediate layer 4 by magnetostatic coupling. The high magnetization layer 6, which is in contact with the recording layer 5, has a particularly strong function. Consequently, the magnetic domain can be readily transferred from the recording layer 5 to the reproducing layer 3 through the intermediate layer 4 by magnetostatic coupling. The high magnetization layer 66 of the magneto-optical recording medium 10 functions similarly to the high magnetization layer 6 of the magneto-optical recording medium 1.

Figure 11:
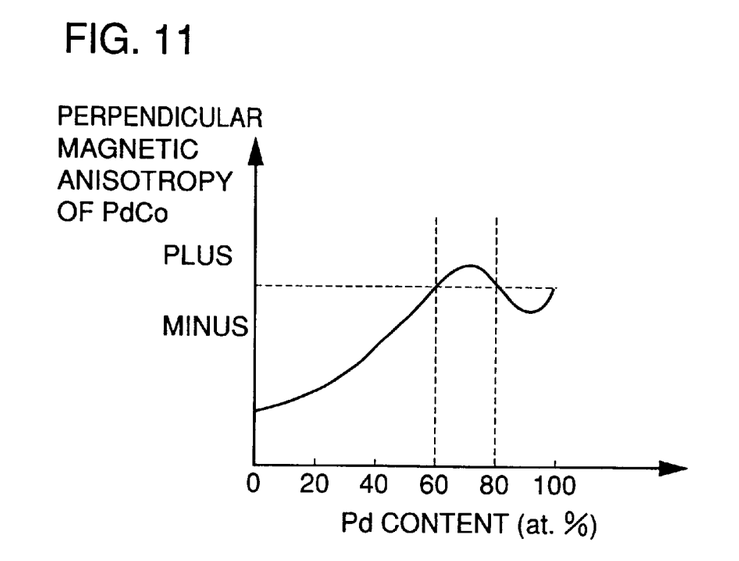
FIG. 11 illustrates the anisotropy of a PdCo alloy employed for a high magnetization layer shown in FIG. 3 with respect to a Pd content.

FIG. 11 shows the magnetic anisotropy of the alloy of Pd and Co with respect to the content of Pd in the high magnetization layer 6. The term "plus anisotropy" indicates a perpendicular magnetization direction and the term "minus anisotropy" indicates an in-plane magnetization direction. The magnetization direction of the high magnetization layer 6 formed on the recording layer 5 is identical to that of the recording layer 5, and preferably has plus anisotropy. The alloy of Pd and Co has plus anisotropy when the Pd content is in the range of 60 to 80 at. %. Therefore, the Pd content in the alloy of Pd and Co is suitably in the range of 60 to 80 at. %.

Figure 12:
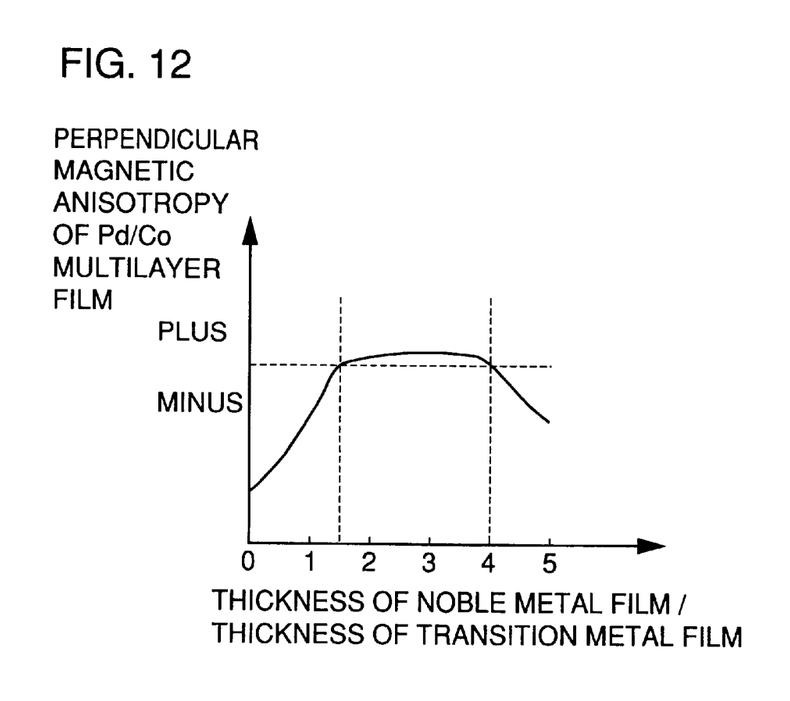
FIG. 12 illustrates the anisotropy of a Pd/Co multilayer film employed for a high magnetization layer shown in FIGS. 4 and 5 with respect to the ratio of a Pd film thickness to a Co film thickness.

FIG. 12 illustrates the anisotropy of the high magnetization layer 66 formed by alternately stacking the thin films of Pd and those of Co with respect to a thickness ratio defined as the ratio of the Pd film thickness to the Co film thickness. It is understood from FIG. 12 that the Pd/Co multilayer film has plus anisotropy when the ratio of the Pd film thickness to the Co film thickness is in the range of 1.5 to 4. The magnetization direction of the high magnetization layer 66, which is formed on the recording layer 5, is preferably identical to that of the recording layer 5. Therefore, the ratio of the Pd film thickness to the Co film thickness is preferably in the range of 1.5 to 4 so that the Pd/Co multilayer film has plus anisotropy. While the thicknesses of the Pd and Co films are set at 8 Å and 2 Å in the above description, the ratio of the Pd film thickness to the Co film thickness can be set in the range of 1.5 to 4 while setting the total film thickness of the Pd/Co multilayer film in the range of 300 to 800 Å.

Figure 13:
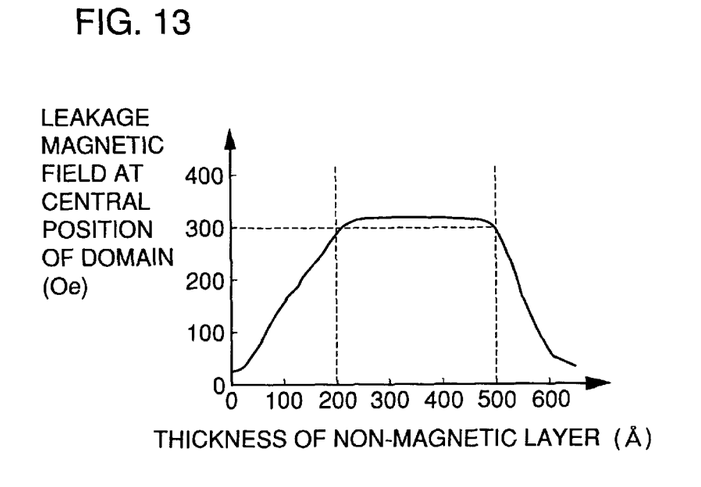
FIG. 13 illustrates the dependency of tile leakage magnetic field from the recording layer to the reproducing layer shown in FIG. 10 on the thickness of a non-magnetic layer at the center of its domain.

FIG. 13 illustrates the dependency of the leakage magnetic field from the recording layer 5 to the reproducing layer 3 on the thickness of a non-magnetic layer at the center of the domain. The non-magnetic layer is employed for the intermediate layer 4, and hence the intensity of the leakage magnetic field from the recording layer 5 to the reproducing layer 3 varies with the thickness of the non-magnetic layer at the center of the domain. It is understood from FIG. 13 that the intensity of the leakage magnetic field is increased with the thickness of the non-magnetic layer at the center of the domain and exceeds 300 Oe when the thickness is in the range of 200 to 500 Å. The intensity of the leakage magnetic field is reduced when the thickness of the non-magnetic layer exceeds 500 Å. Therefore, the thickness of the non-magnetic layer is suitably in the range of 200 to 500 Å, so that the leakage magnetic field from the recording layer 5 to the reproducing layer 3 is so distributed that the intensity thereof is increased from ends of its domain toward the center while magnetic leakage fields, present outside the domain, opposite to the magnetization direction of the magnetic domain to be transferred from the recording layer 5 to the reproducing layer 3 are reduced in intensity.

In the magneto-optical recording medium according to the present invention, the magnetic material for the high magnetization layer 6 is not restricted to the alloy or the multilayer film of a noble metal and a transition metal but may be prepared from a material containing a transition metal such as Fe or Co and a metal such as Nd having a magnetic moment ferromagnetically exchange-coupling with the transition metal.

Figure 14:
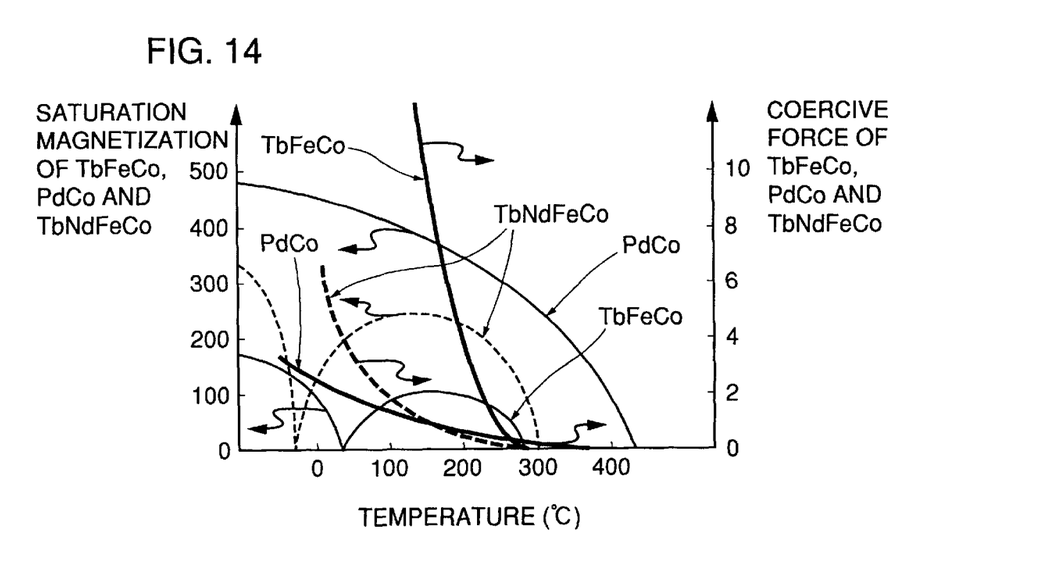
FIG. 14 illustrates the temperature dependencies of saturation magnetization and coercive force of TbFeCo, PdCo and TbNdFeCo.

For example, the high magnetization layer 6 is prepared from TeNbFeCo obtained by adding Nd to TbFeCo employed as the magnetic material for the recording layer 5. A magneto-optical recording medium employing TbNdFeCo as the material for the high magnetization layer 6 has the same sectional structure as that of the magneto-optical recording medium 1 shown in FIG. 3, while the thicknesses of layers forming this magneto-optical recording medium are identical to those of the layers forming the magneto-optical recording medium 1. The magnetic characteristics of TbNdFeCo are now described with reference to FIG. 14. FIG. 14 shows the temperature dependencies of saturation magnetization and coercive force of TbNdFeCo, in addition to those shown in FIG. 8. The saturation magnetization of TbNdFeCo is larger than that of TbFeCo in the range of the room temperature to 300° C. In particular, the former is at least twice the latter at a temperature of about 100° C. for reproducing the signal from the magneto-optical recording medium, and TbNdFeCo can be sufficiently employed as the material for the high magnetization layer 6. However, the coercive force of TbFeCo is larger than that of TbNdFeCo at the room temperature.

Conditions for preparing TbNdFeCo by magnetron sputtering are now described with reference to the following Table:

TABLE

| | |
|---|---|
| Ar Flow Rate (sccm) | 30–70 |
| Ar Gas Pressure (mTorr) | 5–30 |
| Deposition Rate of TbNd (Å/sec.) | 0.5–3.0 |
| Deposition Rate of FeCo (Å/sec.) | 1.0–3.0 |
| RF power (W) | 100–400 |

In order to prepare TbNdFeCo by magnetron sputtering, a target of TbNd and that of FeCo are employed for alternately passing a substrate through portions on these targets. The flow rate of Ar gas employed for the sputtering is in the range of 30 to 70 sccm, and the Ar gas pressure is in the range of 5 to 30 mTorr. RF power applied to the targets is in the range of 100 to 400 W. In this case, the deposition rate of TbNd is in the range of 0.5 to 3.0 Å/sec., and that of FeCo is in the range of 1.0 to 3.0 Å/sec. The composition ratio of the elements forming TbNdFeCo is adjusted by controlling the deposition rates of TbNd and FeCo. The optimum composition of TbNdFeCo for the high magnetization layer 6 is $Tb_{10}Nd_{13}Fe_{66}Co_{11}$, and this composition ratio is attained when the deposition rates of TbNd and FeCo are 1.0 Å/sec. and 1.5 Å/sec. respectively.

The high magnetization layer 6 of TbNdFeCo has the function described with reference to FIGS. 9A to 9C, similarly to the high magnetization layer 6 prepared from the alloy of a noble metal and a transition metal. Therefore, the intensity of the leakage magnetic field from the recording layer 5 to the reproducing layer 3 is increased due to the presence of the high magnetization layer 6, and the magnetic domain of the recording layer 5 is readily transferred to the reproducing layer 3 through the intermediate layer 4 by magnetostatic coupling. Also in reproduction by enlargement of the magnetic domain, the magnetic domain can be readily transferred from the recording layer 5 to the reproducing layer 3.

While Nd is employed as the metal having the magnetic moment ferromagnetically exchange-coupling with the transition metal in the above description, the present invention is not restricted to this but the metal can be prepared from Pr or a general light rare earth metal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto-optical recording medium comprising:
    a reproducing layer;
    an intermediate layer formed on said reproducing layer; and
    a recording layer formed on said intermediate layer, said recording layer including:
    a first layer having first saturation magnetization and first coercive force, and
    a second layer having a composition different from said first layer and having second saturation magnetization greater than said first saturation magnetization at a reproducing temperature and second coercive force less than said first coercive force at the room temperature.

2. The magneto-optical recording medium in accordance with claim 1, wherein
    said second layer contains a noble metal and a transition metal.

3. The magneto-optical recording medium in accordance with claim 2, wherein
    said noble metal is one selected from a group of Pt, Pd, Au, Cu and Ag, and
    said transition metal is one selected from a group of Co, Fe, Ni and Mn.

4. The magneto-optical recording medium in accordance with claim 1, wherein
    said second layer is made of an alloy of a noble metal and a transition metal.

5. The magneto-optical recording medium in accordance with claim 4, wherein
    the content of said noble metal in said alloy is in the range of 60 to 80 at. %.

6. The magneto-optical recording medium in accordance with claim 1, wherein
    said second layer is formed by alternately stacking a first thin film made of a noble metal and a second thin film made of a transition metal.

7. The magneto-optical recording medium in accordance with claim 6, wherein
    the ratio of the thickness of said first thin film to that of said second thin film is in the range of 1.5 to 4.

8. The magneto-optical recording medium in accordance with claim 1, wherein
    said second layer contains a transition metal and a metal having a magnetic moment ferromagnetically exchange-coupling with said transition metal.

9. The magneto-optical recording medium in accordance with claim 8, wherein
    said metal is a light rare earth metal.

10. The magneto-optical recording medium in accordance with claim 9, wherein
    said light rare earth metal is Nd or Pr.

11. The magneto-optical recording medium in accordance with claim 1, wherein
    said intermediate layer-is made of a non-magnetic material.

12. The magneto-optical recording medium in accordance with claim 11, wherein
    the thickness of said intermediate layer is in the range of 200 to 500 Å.

13. A magneto-optical recording layer comprising:
    a reproducing layer;
    an intermediate layer formed on said reproducing layer;
    a first recording layer formed on said intermediate layer; and
    a second recording layer formed on said first recording layer and having a composition different from said first recording layer,
        wherein one of said first and second recording layers has saturation magnetization greater than that of another of said first and second recording layers at a reproducing temperature.

14. The magneto-optical recording medium in accordance with claim 13, wherein
    said another recording layer has coercive force greater than that of said one recording layer at the room temperature.

* * * * *